US008326833B2

(12) United States Patent
Muguda

(10) Patent No.: US 8,326,833 B2
(45) Date of Patent: Dec. 4, 2012

(54) IMPLEMENTING METADATA EXTRACTION OF ARTIFACTS FROM ASSOCIATED COLLABORATIVE DISCUSSIONS

(75) Inventor: Naveenkumar V. Muguda, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 11/867,176

(22) Filed: Oct. 4, 2007

(65) Prior Publication Data
US 2009/0094267 A1   Apr. 9, 2009

(51) Int. Cl.
*G06F 7/00* (2006.01)
*G06F 17/30* (2006.01)

(52) U.S. Cl. ........ 707/736; 707/755; 707/758; 707/811; 707/944; 707/770; 715/230; 704/9

(58) Field of Classification Search .................. 707/736, 707/755
See application file for complete search history.

(56) References Cited

U.S. PATENT DOCUMENTS

| | | | | |
|---|---|---|---|---|
| 7,047,241 B1* | 5/2006 | Erickson | ............................. | 1/1 |
| 7,200,804 B1* | 4/2007 | Khavari et al. | ............... | 715/230 |
| 7,290,207 B2* | 10/2007 | Colbath et al. | ............... | 715/234 |
| 7,353,246 B1* | 4/2008 | Rosen et al. | .................. | 709/202 |
| 7,539,934 B2* | 5/2009 | Kender et al. | ................. | 715/233 |
| 2004/0261016 A1* | 12/2004 | Glass et al. | ................... | 715/512 |
| 2005/0108630 A1* | 5/2005 | Wasson et al. | ............... | 715/513 |
| 2006/0048047 A1* | 3/2006 | Tao | ............................. | 715/512 |
| 2006/0100995 A1* | 5/2006 | Albornoz et al. | ................. | 707/3 |
| 2006/0161578 A1* | 7/2006 | Siegel et al. | .................. | 707/102 |
| 2006/0282336 A1* | 12/2006 | Huang | ........................... | 705/26 |
| 2008/0066100 A1* | 3/2008 | Brodersen et al. | .............. | 725/35 |
| 2008/0097985 A1* | 4/2008 | Olstad et al. | ..................... | 707/5 |
| 2008/0270406 A1* | 10/2008 | Flavin et al. | ..................... | 707/8 |

* cited by examiner

*Primary Examiner* — Robert Beausoliel, Jr.
*Assistant Examiner* — Susan F Rayyan
(74) *Attorney, Agent, or Firm* — DeLizio Gilliam, PLLC

(57) ABSTRACT

A natural language processor receives a document and accesses commentary related to the document. In response to accessing commentary related to the document, the natural language processor processes the commentary to generate data structures corresponding to the commentary. Rules are executed on these data structures to generate metadata for the document. The resulting metadata is associated with the document, which can be harnessed by the features of the document management systems to provide additional operations on the document.

12 Claims, 7 Drawing Sheets

US 8,326,833 B2

IMPLEMENTING METADATA EXTRACTION OF ARTIFACTS FROM ASSOCIATED COLLABORATIVE DISCUSSIONS

BACKGROUND OF THE INVENTION

1. Technical Field

The present invention relates in general to the field of data processing systems. More specifically, the present invention relates to the field of organizing data on data processing systems.

2. Description of the Related Art

As the size of businesses increase, the popularity of electronic cataloging of documents increase. Document management systems enable categorization, searching, and organization of documents to facilitate the retrieval and discovery of documents in the document management systems.

SUMMARY OF THE INVENTION

The present invention includes a system and method for implementing metadata extraction on a data processing system. A natural language processor receives a document and accesses commentary related to the document. In response to accessing commentary related to the document, the natural language processor processes the commentary to generate data structures corresponding to the commentary. Rules are executed on these data structures to generate metadata for the document. The resulting metadata is associated with the document, which can be harnessed by the features of the document management systems to provide additional operations on the document.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN EMBODIMENT

Figure 1:
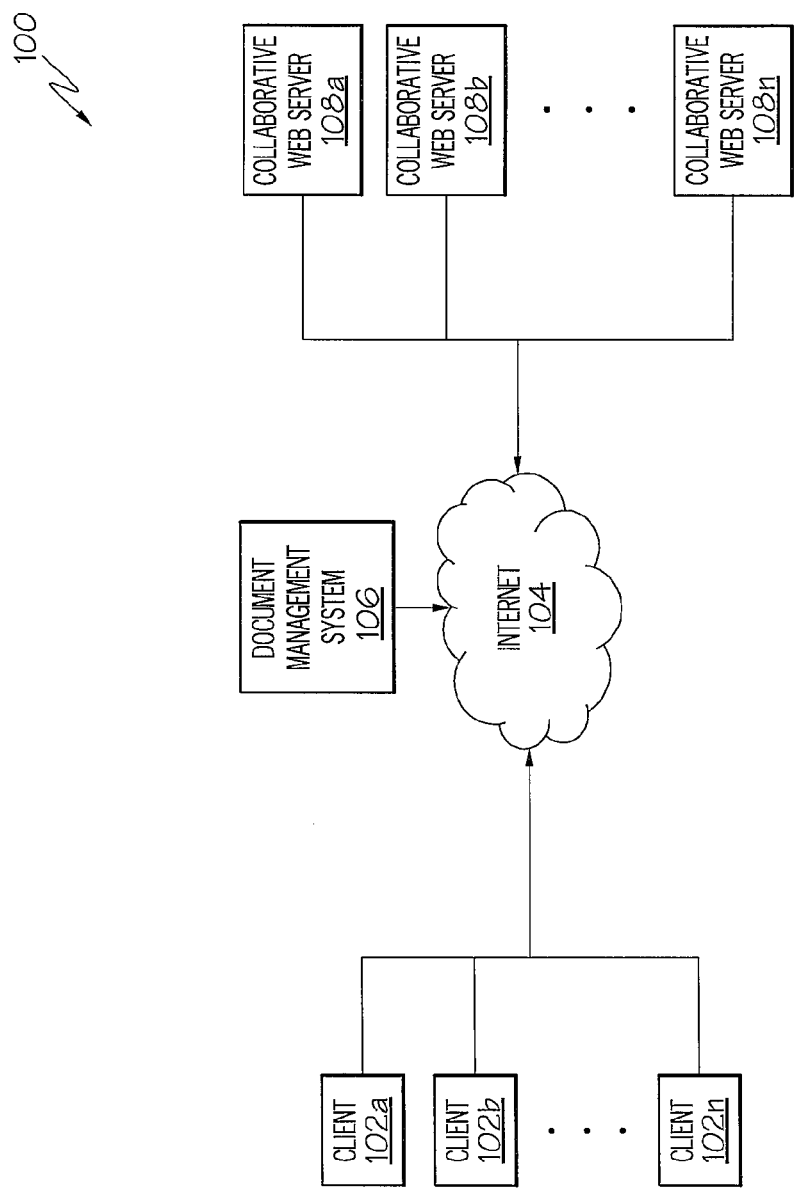
FIG. 1 is a block diagram illustrating an exemplary network in which an embodiment of the present invention may be implemented.

Referring now to the figures, an in particular, referring to FIG. 1, there is illustrated an exemplary network 100 in which an embodiment of the present invention may be implemented. As illustrated, exemplary network 100 includes a collection of clients 102a-102n, Internet 104, document management system 106, and collaborative web servers 108a-108n.

To facilitate discussion, assume for exemplary reasons that exemplary network 100 implements metadata extraction from comments made on collaborative websites (e.g., collaborative websites stored on collaborative web servers 108a-108n) about invention disclosures stored in a document manager in document management system 106. The extracted metadata facilitates searching and querying of invention disclosures in the document manager. Invention disclosure reviewers utilize clients 102a-102n to access invention disclosures stored document manager system 106. Also, invention disclosure reviewers utilize clients 102a-102n to make comments on the invention disclosures on collaborative websites hosted on collaborative web servers 108a-108n. Of course, those with skill in the art will understand that the present invention is not limited to metadata extraction from comments made on collaborative websites on invention disclosures, but may include other types of data such as movies, literature, resumes, and the like.

Clients 102a-102n are coupled to document management system 106 and collaborative web servers 108a-108n via Internet 104. While Internet 104 is utilized to couple clients 102a-102n to document management system 106 and collaborative web servers 108a-108n, those with skill in the art will appreciate that a local-area network (LAN) or wide-area network (WAN) utilizing Ethernet, IEEE 802.11x, or any other communications protocol may be utilized. Those with skill in the art will appreciate that exemplary network 100 may include other components such as routers, firewalls, etc. that are not germane to the discussion of the present network and will not be discussed further herein.

Figure 2:
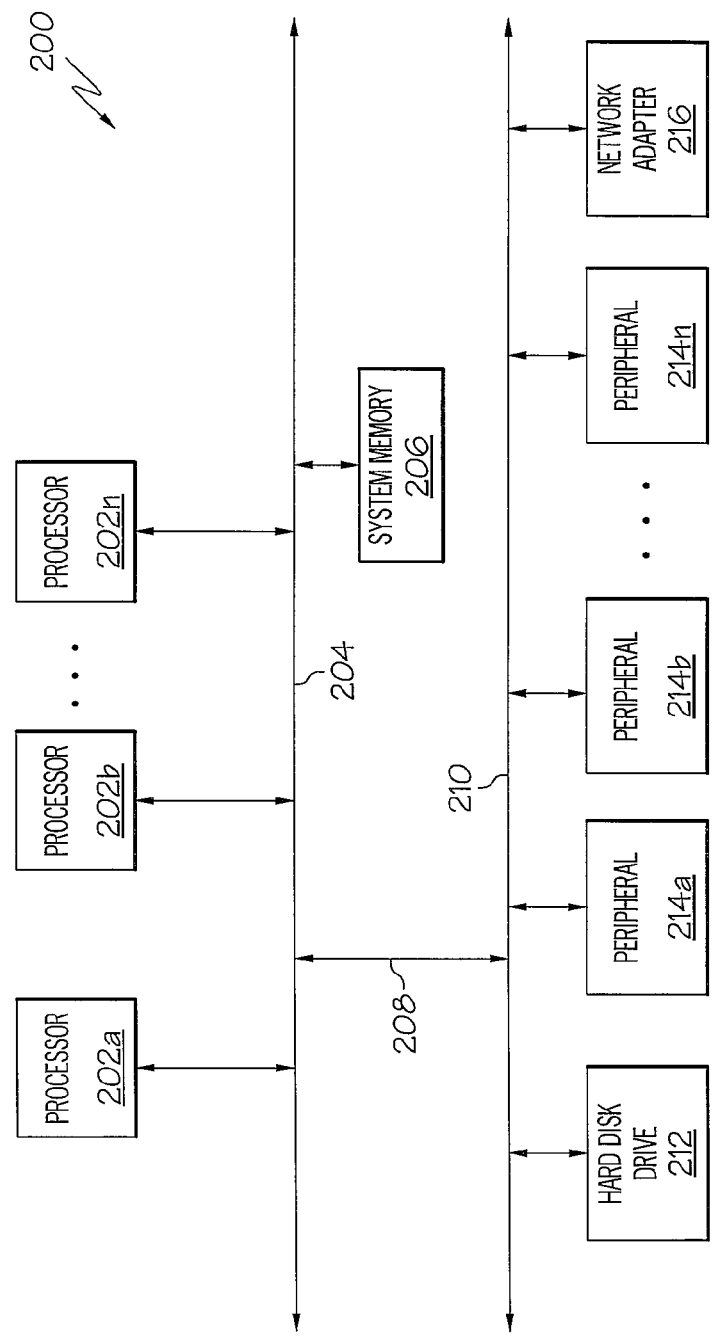
FIG. 2 is a block diagram depicting an exemplary data processing system in which an embodiment of the present invention may be implemented.

FIG. 2 is a block diagram depicting an exemplary data processing system 200, which may be utilized to implement clients 102a-102n, document management system 106, and collaborative web servers 108a-108n, as shown in FIG. 1, in accordance with an embodiment of the present invention. As shown, exemplary data processing system 200 includes a collection of processors 202a-202n that are coupled to system memory 206 via system bus 204. System memory 206 may be implemented by dynamic random access memory (DRAM) modules or any other type of random access memory (RAM) module. Mezzanine bus 208 couples system bus 204 to peripheral bus 210. Coupled to peripheral bus 210 is a hard disk drive 212 for mass storage and a collection of peripherals 214a-214n, which may include, but are not limited to, optical drives, other hard disk drives, printers, input devices and the like. Network adapter 216 enables data processing system 200 to communicate with a network (e.g., Internet 104, a LAN, a WAN, and the like).

Those with skill in the art will appreciate that data processing system 200 can include many additional components not specifically illustrated in FIG. 2. Because such additional components are not necessary for an understanding of the present invention, they are not illustrated in FIG. 2 or discussed further herein. It should be understood that the enhancements to data processing system 200 provided by the present invention are applicable to data processing systems of any system architecture and are in no way limited to the generalized multi-processor architecture illustrated in FIG. 2.

Figure 3A:
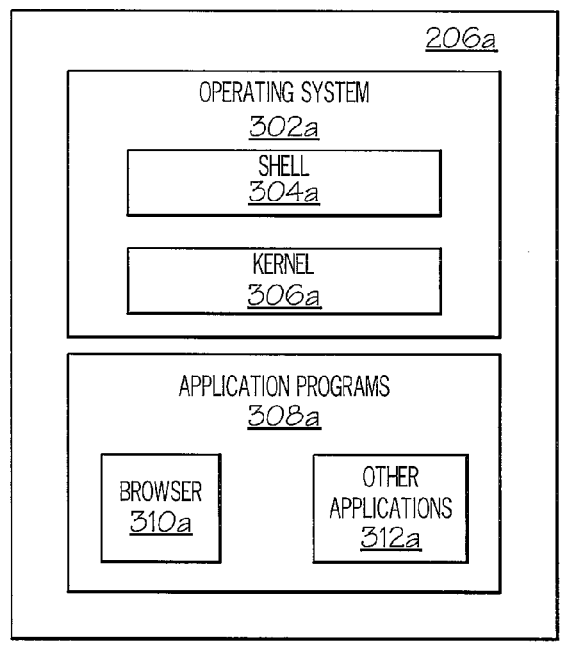
FIG. 3A-3C are block diagrams illustrating exemplary contents of the system memories of a collection of clients, a document management system, and collaborative web servers as shown in FIG. 1.
Figure 3B:
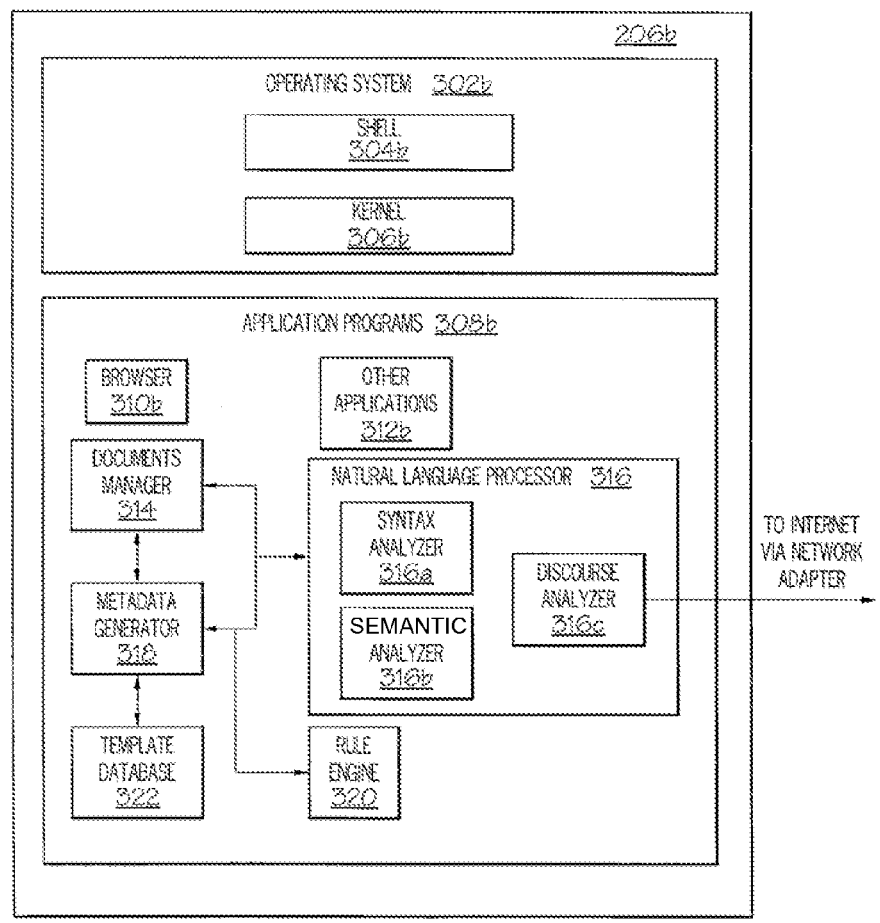
Figure 3C:
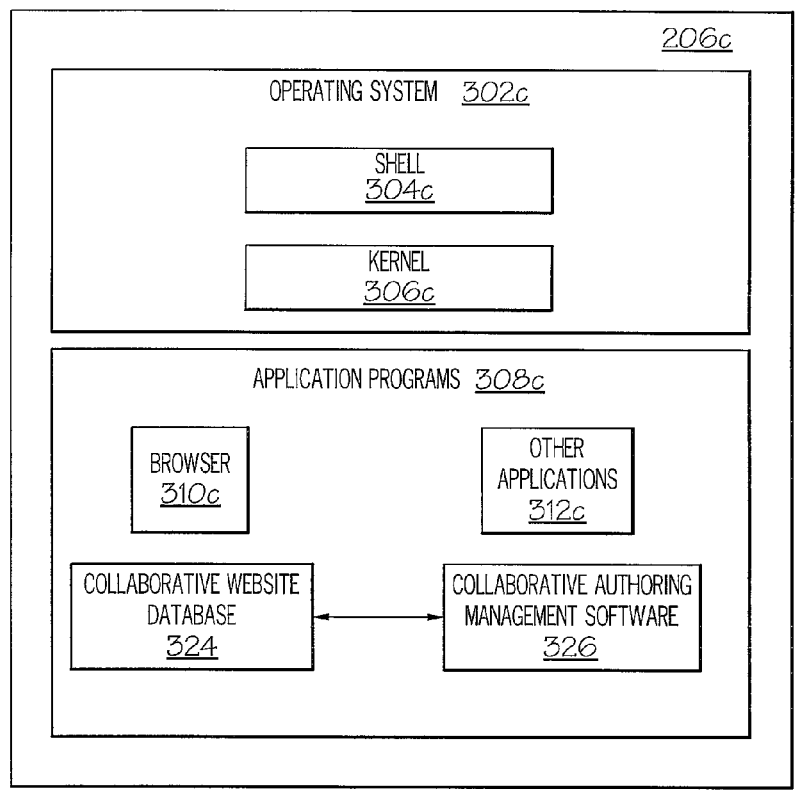

FIGS. 3A-3C are block diagrams showing exemplary contents of system memory 206a of clients 102a-102n, system memory 206b of document management system 106, and system memory 206c of collaborative web servers 108a-108n according to an embodiment of the present invention. As shown, system memories 206a-206c include operating systems 302a-302c, which further includes shells 304a-304c (as they are called in UNIX®) for providing transparent user access to resources such as application programs 308a-308c. Generally, shells 304a-304c, also called command processors in Windows®, are generally the highest level of the operating system software hierarchy and serve as command interpreters. Shells 304a-304c provide system prompts, interpret commands entered by keyboard, mouse, or other user input media, and sends the interpreted command(s) to the appropriate lower levels of the operating system (e.g., kernels 306a-306c) for processing. Note that while shells 304a-304c are text-based, line-oriented user interfaces, the present invention will support other user interface modes, such as graphical, voice, gestural, etc. equally well.

As illustrated, operating systems 302a-302c also include kernels 306a-306c, which includes lower levels of functionality for operating systems 302a-302c and application programs 308a-308c, including memory management, process and task management, disk management, and mouse and keyboard management. Application programs 308a-308c can include browsers 310a-310c utilized for access to Internet 104 (FIG. 1), word processors, spreadsheets, and other application programs 312a-312c.

As shown in FIG. 3B, system memory 206b of document management system 106 also includes a document manager 314, natural language processor 316, metadata generator 318, rule engine 320, and template database 322. As illustrated in FIG. 3C, system 206c of collaborative web servers 108a-108n includes collaborative website database 324 and collaborative authoring management software 326. As previously discussed, assume for exemplary purposes that document manager 314 stores a collection of invention disclosures. An "invention disclosure" is a document submitted by an inventor that describes the technical specifications of an invention. In some large organizations such as universities and/or corporations, inventors may submit invention disclosures to a database for review. Invention disclosure reviewers review the collection of invention disclosures for invention disclosures that may be suitable for patent protection.

Utilizing clients 102a-102n (FIG. 1), invention disclosure reviewers (which are not authors of the invention disclosure) may access document manager 314 to review invention disclosures. Subsequent to the review, invention disclosure reviewers may access collaborative websites to comment on the reviewed invention disclosures. A "collaborative website" is a repository of information stored in collaborative website database 324 that enables contributors with the ability to add, edit, and remove text. In an embodiment of the present invention, invention disclosure reviewers may comment on invention disclosures on collaborative websites, bulletin boards, or any type of data repository that enables users to add and/or edit text. Collaborative authoring management software 326 controls access to collaborative website database 324.

According to an embodiment of the present invention, the collaborative websites may be stored on collaborative web servers 108a-108n (FIG. 1), which may be accessed by clients 102a-102n via Internet 104 (FIG. 1). However, those with skill in the art will appreciate that the collaborative websites may be stored anywhere on network 100 including, but not limited to document management system 106.

As discussed in more detail in conjunction with FIG. 4, natural language processor 316 accesses any collaborative websites hosted on collaborative web servers 108a-108n to retrieve metadata about invention disclosures stored in document manager 314. Natural language processor 316 further includes a syntax analyzer 316a, semantic analyzer 316b, and a discourse analyzer 316c. One of the tasks of discourse analyzer 316c is anaphora resolution. "Anaphora resolution" is utilized to analyze text that includes pronouns and is a method of associating the pronouns to nouns to which the pronouns refer. For example, consider the following text sample: "John has a dog. It is cute." Utilizing anaphora resolution, discourse analyzer 316c determines that the pronoun in the text sample is "it" and the pronoun refers to "dog". Discourse analyzer 316c performs anaphora resolution by creating a list of all prior nouns and filtering the list based on the proximity to the pronoun, if applicable, other characteristics between the noun and pronoun match (e.g., gender). According to an embodiment of the present invention, the antecedent noun might be missing from the body of the text and might be the object that the document might be representing. Discourse analyzers need to be enhanced to consider the document when resolving antecedents by adding the document to a list of nouns. According to an embodiment of the present invention, a document is implemented as an invention disclosure. However, as previously discussed, the document may be implemented as a resume, a movie, book, or any other type of media, which may be added to the list of nouns. Discourse analyzer 316c may be able to make the associations between pronoun and noun based on the information provided in step 403 as depicted in FIG. 4.

The other subsystems of natural language processor 316 include syntax analyzer 316a and semantic analyzer 316b. Syntax analyzer 316a identifies the parts of speech each word in the text sample represents. Semantic analyzer 316b performs case grammar analysis to identify concepts like agent, location, and subject within the text sample.

Figure 4A:
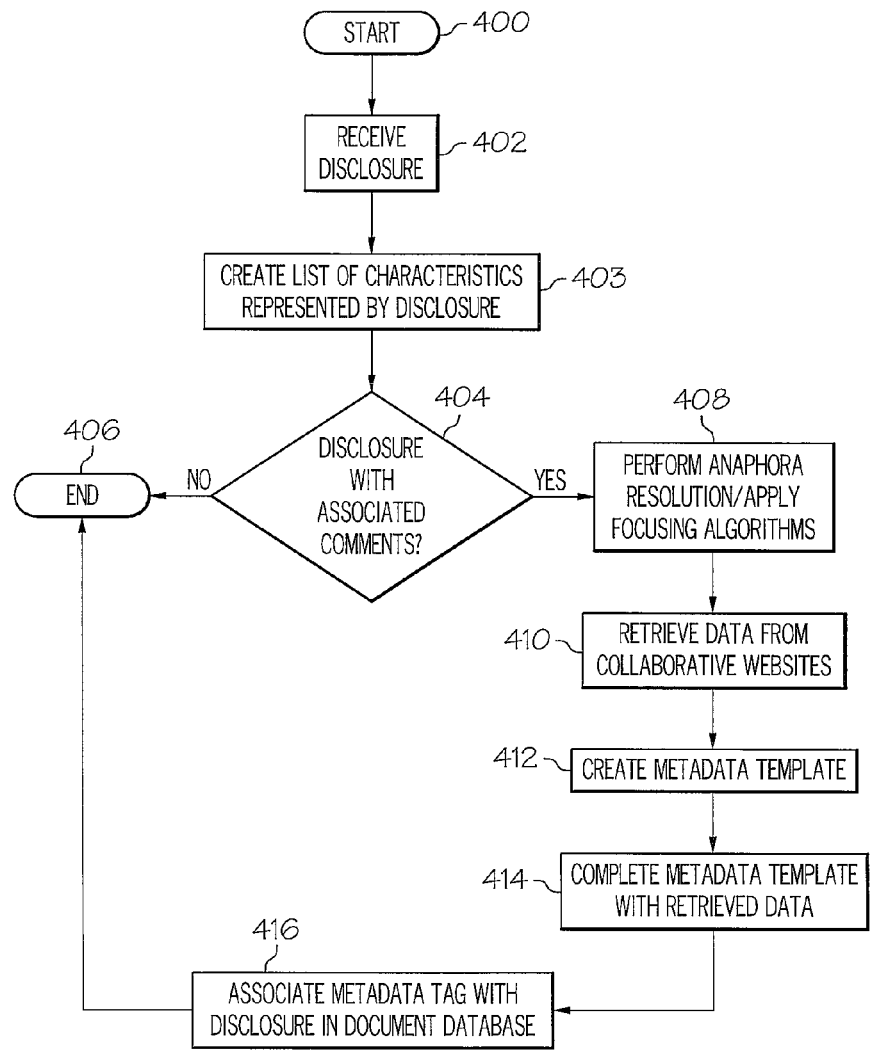
FIG. 4A is a high-level logical flowchart depicting an exemplary method for implementing metadata extraction on a data processing system.

Rule engine 320 generates rules to tag parts of sentences stored on collaborative websites. According to an embodiment of the present invention, rule engine 320 performs case grammar analysis to identify the parts of speech for each component of the sentences. The rules may be domain independent and may be enabled by the use of thematic roles, which is a semantic relationship between a predicate and an argument of a sentence. For example, thematic roles include, but are not limited to:

Agent: a noun that is the deliberate performer of an action
Experiencer: a noun that is the receiver of sensory or emotional input
Theme: a noun that is the recipient of an action, but does not change its state
Patient: a noun that undergoes an action and has its state changed
Instrument: a noun that is used to carry out an action
Cause: a noun that mindlessly performs an action
Location: a location where the action occurs
Goal: a location or noun where the action is directed towards
Source: a location or noun where the action originated FIG. 4A is a high-level logical flowchart illustrating an exemplary method for implementing metadata extraction of artifacts from associated collaborative discussions on a data processing system according to an embodiment of the present invention. The process begins at step 400 and proceeds to step 402, which illustrates metadata generator 318 receiving a document (e.g., an invention disclosure) from document manager 314. Metadata generator 318 creates a list of characteristics of the entity the document represents, as shown in step 403. These characteristics may include, but are not limited to, information like gender, if the document represents an inanimate object amongst others. The characteristics are passed on to natural language processor 316. The process continues to step 404, which depicts discourse analyzer 316c determining if any comments exists for the particular document. In an embodiment of the present invention, discourse analyzer 316c can examine collaborative website databases 324 of collaborative web servers 108a-108n to determine if any comments authored by people other than the author of the particular document related to the particular document exist. In another embodiment of the present invention a record of any collaborative web servers 108a-108n that have stored comments about the particular document may be saved in document manager 314.

If metadata generator 318 determines that no comments exist for the particular document, the process ends, as shown in step 406. However, if metadata generator 318 determines that comments exist for the particular document, the process continues to step 408.

For ease of discussion, assume for exemplary purposes that the title of the particular invention disclosure is "X". Also, assume that at least one invention disclosure reviewer has read "X" and has posted comments on a collaborative website (e.g., a wiki) hosted on collaborative web server 108a. Assume that the wiki page associated with invention disclosure "X" includes the following comment:

X is an interesting idea. It seems novel, but it is not implementable with the current state of the art.

Discourse analyzer 316c performs anaphora resolution to map the pronoun "It" to "X". Syntax analyzer 316a tries to identify the parts of speech each word in the text represents, and semantic analyzer 316b can perform case grammar analysis to identify concepts including, but not limited to, agent, location, and subject within sentences of the text. For example syntax analyzer 316a will categorize "interesting" as an adjective and "idea" as a noun.

The process continues to step 410, which shows discourse analyzer 316 retrieving comments from collaborative web servers 108a-108n regarding the document. The administrator or some super user of document management system 106 (FIG. 1) can write rules on the data structures returned by natural language processor 316 to identify relevant metadata of the document from the associated comments. Metadata generator 318 retrieves the rules and executes them on the data structures returned by natural language processor 316. In the case of the above sample comment, the first sentence is broken down as (X, Proper Noun) (is, Verb) (interesting, Adjective) (idea, Noun). If the rule is of form: "(if proper noun=instance of invention disclosure) and (verb is "is") then (extract the adjective from that sentence). Also, the administrator or the template creator provides a set of characteristics that metadata generator 318 should capture for the document.

The process proceeds to step 412, which illustrates metadata template generator 318 creating metadata templates to organize metadata retrieved by metadata generator 318. The created metadata templates are stored in template database 322. According to an embodiment of the present invention, a metadata template may be computer-generated, created by a user/system administrator, or generated by a combination of computer-generated algorithms and user/system administrator input. Also, according to an embodiment of the present invention, the rules may be defined by a user/system administrator. For the purposes of discussion and not of limitation, a metadata template may be represented as follows:
 Interesting: Boolean
 Implementable: Boolean
 Novel: Boolean
 Adjectives: List In the aforementioned example, the administrator denotes interest in identifying whether the invention disclosed in the document is interesting, implementable, and novel. Also, the administrator indicates interest in capturing all the adjectives used within the given document. The administrator-provided rules will be of the form: "if the subject of the sentence is x, then check if 'interesting' is the adjective used. If no negation is signified, then interesting is 'yes', else 'interesting' is 'no'".

The second half of the metadata template entry is completed as follows: (1) rule engine 320 tries to apply the rules based on the combined data structures from syntax analyzer 316a, semantic analyzer 316b, and discourse analyzer 316c. The second half of a metadata template entry is filled with the appropriate metadata retrieved by discourse analyzer 316, as shown in step 414. And example of a filled metadata template (hereinafter "metadata tag") utilizing the aforementioned wiki comment may be as follows:
 Invention title: X
 Interesting: Yes
 Implementable: No
 Novel: Yes
 Adjectives: {interesting . . . }

Metadata generator 318 associates the metadata tag to the particular invention disclosure and saves completed metadata template in document manager 314, as illustrated in step 416. Then, the process ends, as depicted in step 406. The creation of metadata tags facilitates future queries of document manager 314. For example, to retrieve invention disclosure X, a user may enter "idea.interesting=yes and idea.implementable=no" as a query to document manager 314.

Figure 4B:
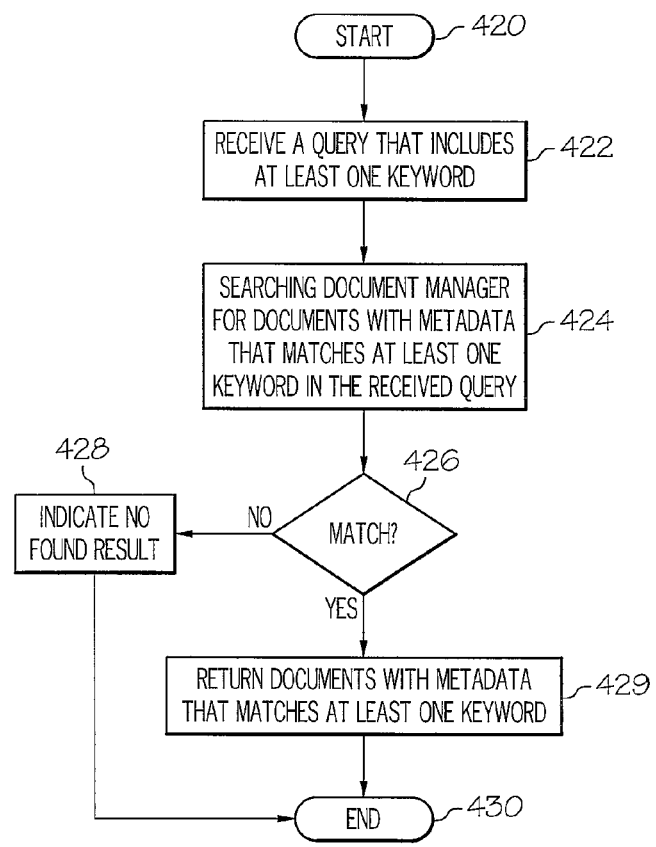
FIG. 4B is a high-level logical flowchart illustrating an exemplary method for responding to a query according to an embodiment of the present invention.

FIG. 4B is a high-level logical flowchart depicting an exemplary method for responding to a query according to an embodiment of the present invention. The process begins at step 420 and proceeds to step 422, which includes document manager 314 receiving a query (e.g., a search query from clients 102a-102n or any other data processing system accessing document manager 314) that includes at least one keyword. The process continues to step 424, which depicts document manager 314 searching for documents with metadata that matches at least one keyword in the received query.

The process proceeds to step 426, which illustrates document manager 314 determining if at least one document includes metadata that matches at least one keyword in the received query. If there is a match, the process continues to step 429, which depicts document manager 314 responding to the query by returning documents with metadata that matches at least one keyword. The process continues to step 430, which illustrates the process ending.

If there is no match, the process continues to step 428, which illustrates document manager 314 responding to the query by indicating that no results were found. The process ends, as illustrated in step 430.

As discussed, the present invention includes a system and method for implementing metadata extraction on a data processing system. A discourse analyzer receives at least one document and accesses commentary related to the at least one document. In response to accessing commentary related to the at least one document, the discourse analyzer retrieves metadata from the commentary. A metadata tag generator associates the retrieved metadata with the at least one document to facilitate searching for the at least one document.

It should be understood that at least some aspects of the present invention may alternatively be implemented in a computer-usable medium that contains a program product. Programs defining functions in the present invention can be delivered to a data storage system or a computer system via a variety of computer-usable storage media, which include, without limitation, non-writable storage media (e.g., CD-ROM), writable storage media (e.g., hard disk drive, read/ write CD-ROM, optical media), and system memory such as, but not limited to random access memory (RAM), Programs can also be delivered via computer-usable signal-bearing media, examples of which include communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A method comprising:
   a document management system determining characteristics of at least one document;
   accessing collaborative website data;
   retrieving, from the collaborative website data, commentary, authored by persons other than an author of said at least one document, based on the characteristics;
   generating metadata from said commentary;
   selecting a metadata template for said at least one document;
   filling in the metadata template with at least some of the metadata in accordance with a set of rules resulting in a filled metadata template, wherein the set of rules for filling in the metadata template are derived from data structures corresponding to the commentary authored by persons other than the author of said at least one document, wherein a rule of the set of rules comprises extracting a word from the commentary that is an adjective of the at least one document in response to the data structures corresponding to the commentary describing the at least one document using the adjective, wherein filling in the metadata template comprises filling in the metadata with the adjective; and
   associating the filled metadata template with said at least one document.

2. The method according to claim 1, wherein said generating the metadata from said commentary comprises:
   performing language processing on the commentary to identify nouns and adjectives, wherein the metadata is based on the nouns and adjectives.

3. The method according to claim 2, wherein said performing language processing on the commentary comprises:
   performing syntax analysis to identify parts of speech for each word in the commentary, wherein the parts of speech include noun, pronoun, and adjective;
   performing case grammar analysis to identify concepts in the commentary; and
   performing anaphora resolution on the commentary to resolve pronouns to corresponding nouns.

4. The method according to claim 1, wherein said filling in the metadata template with at least some of the metadata in accordance with the set of rules resulting in the filled metadata template comprises extracting the at least some of the metadata from the metadata in accordance with the set of rules.

5. A system comprising:
   at least one processor;
   a bus coupled to said at least one processor;
   a computer-usable storage medium embodying computer program code, said computer program code comprising instructions executable by said at least one processor and configured for:
   determining characteristics of at least one document;
   accessing collaborative website data;
   retrieving, from the collaborative website data, commentary, authored by persons other than an author of said at least one document, based on the characteristics;
   generating metadata from said commentary;
   selecting a metadata template for said at least one document;
   filling in the metadata template with at least some of the metadata in accordance with a set of rules resulting in a filled metadata template, wherein the set of rules for filling in the metadata template are derived from data structures corresponding to the commentary authored by persons other than the author of said at least one document, wherein a rule of the set of rules comprises extracting a word from the commentary that is an adjective of the at least one document in response to the data structures corresponding to the commentary describing the at least one document using the adjective, wherein filling in the metadata template comprises filling in the metadata with the adjective; and
   associating the filled metadata template with said at least one document.

6. The system of claim 5, wherein said generating the metadata from said commentary comprises:
   performing language processing on the commentary to identify nouns and adjectives, wherein the metadata is based on the nouns and adjectives.

7. The system of claim 6, wherein said performing language processing on the commentary comprises:
   performing syntax analysis to identify parts of speech for each word in the commentary, wherein the parts of speech include noun, pronoun, and adjective;
   performing case grammar analysis to identify concepts in the commentary; and
   performing anaphora resolution on the commentary to resolve pronouns to corresponding nouns.

8. The system of claim 5, wherein said filling in the metadata template with at least some of the metadata in accordance with the set of rules resulting in the filled metadata template comprises extracting the at least some of the metadata from the metadata in accordance with the set of rules.

9. A computer-usable storage medium embodying computer program code, said computer program code comprising computer executable instructions configured for:
   determining characteristics of at least one document;
   accessing collaborative website data;
   retrieving, from the collaborative website data, commentary, authored by persons other than an author of said at least one document, based on the characteristics;
   generating metadata from said commentary;
   selecting a metadata template for said at least one document;
   filling in the metadata template with at least some of the metadata in accordance with a set of rules resulting in a filled metadata template, wherein the set of rules for filling in the metadata template are derived from data structures corresponding to the commentary authored by persons other than the author of said at least one document, wherein a rule of the set of rules comprises extracting a word from the commentary that is an adjective of the at least one document in response to the data structures corresponding to the commentary describing the at least one document using the adjective, wherein filling in the metadata template comprises filling in the metadata with the adjective; and associating the filled metadata template with said at least one document.

10. The computer-usable storage medium of claim 9, wherein said generating the metadata from said commentary comprises:

performing language processing on the commentary to identify nouns and adjectives, wherein the metadata is based on the nouns and adjectives.

11. The computer-usable storage medium of claim 10, wherein said performing language processing on the commentary comprises:

performing syntax analysis to identify parts of speech for each word in the commentary, wherein the parts of speech include noun, pronoun, and adjective;

performing case grammar analysis to identify concepts in the commentary; and performing anaphora resolution on the commentary to resolve pronouns to corresponding nouns.

12. The system of claim 9, wherein said filling in the metadata template with at least some of the metadata in accordance with the set of rules resulting in the filled metadata template comprises extracting the at least some of the metadata from the metadata in accordance with the set of rules.

* * * * *